Aug. 18, 1970   C. ISAACSON   3,524,345
METHOD AND APPARATUS FOR MEASURING DELAMINATING FORCES
Filed July 22, 1968
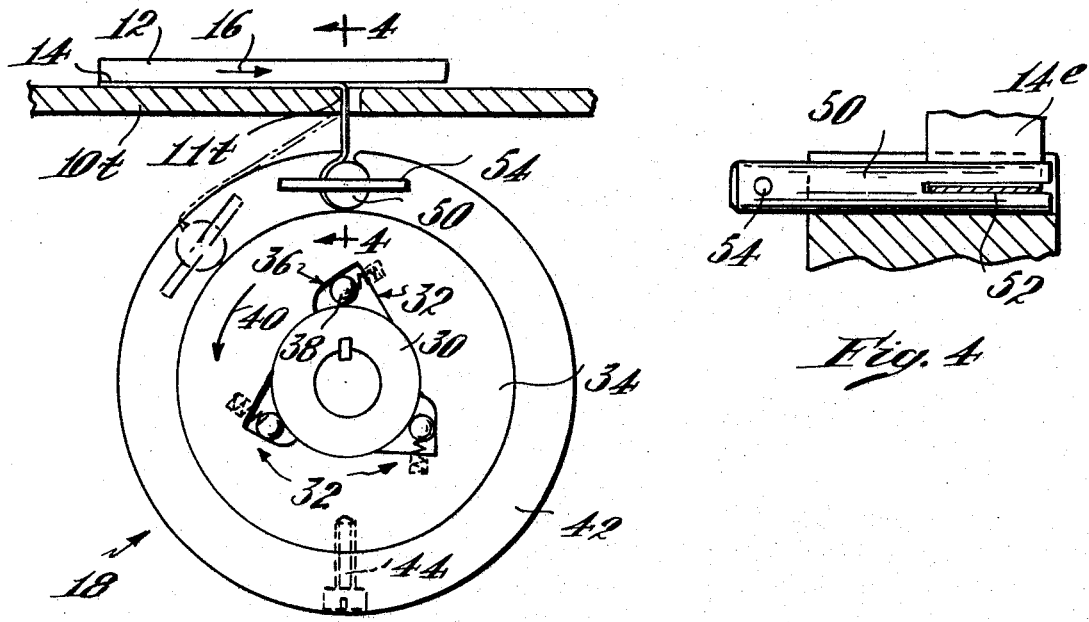
Fig. 3
Fig. 4
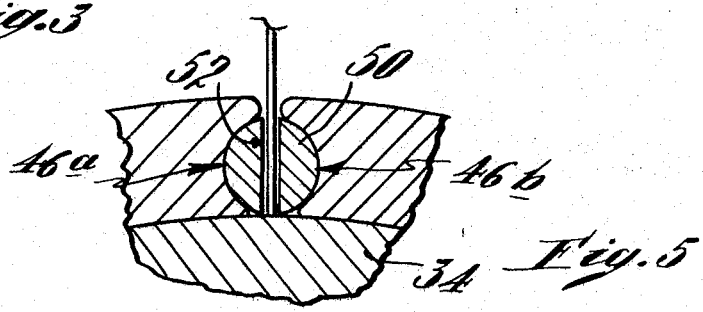
Fig. 5
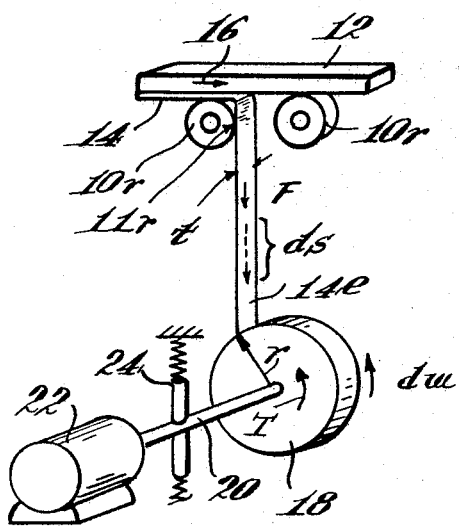
Fig. 1
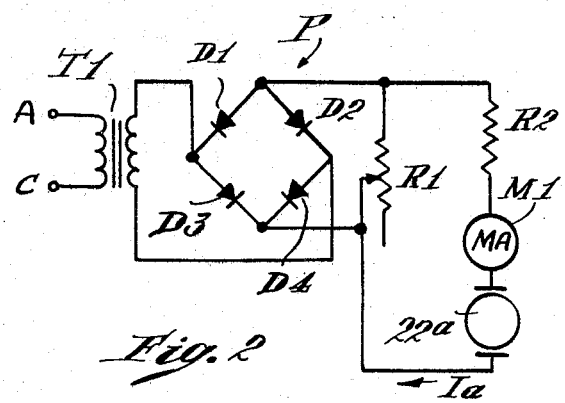
Fig. 2
Inventor
Calvin Isaacson
by Roberts, Cushman & Grover
Attys United States Patent Office 3,524,345
Patented Aug. 18, 1970

1

3,524,345
METHOD AND APPARATUS FOR MEASURING DELAMINATING FORCES
Calvin Isaacson, Beverly, Mass., assignor to Shipley Company, Inc., Newton, Mass., a corporation of Massachusetts
Filed July 22, 1968, Ser. No. 746,501
Int. Cl. G01n *19/04*
U.S. Cl. 73—150         3 Claims

ABSTRACT OF THE DISCLOSURE

The force required to separate a film from a substrate to which it is bonded is measured in apparatus including a support table which permits the substrate and film to slide as the separated film is pulled over a guide edge on the table. The free end of the film is secured tangentially to a drum which is rotated by an electric motor. A milliammeter measures the current drawn by the motor and provides a direct reading, calibratable in appropriate units, of the required delaminating force. The strip is secured to the drum by means of a slotted pin held for rotation by a spring which exerts a pinching force between the film and pin for gripping.

BACKGROUND OF THE INVENTION

The field of this invention relates to testing apparatus designed to provide an indication of bond strength between two separable lamina.

Bond strength determinations are desired for a variety of purposes. They are a convenient measure of the durability of laminates, since the behavior of a laminate under vibration, different temperature coefficients of expansion, and other sources of stresses, is generally related to the force required for delamination. These determinations have been particularly of interest to printed circuit manufacturers and others concerned with selective or complete deposition of thin metallic layers upon rigid nonconductive, e.g. plastic, substrates for this field presents unique and troublesome bonding problems and environmental problems which are of large commercial interest. It is generally the manufacturer's goal to produce a film which is firmly bonded to a substrate either chemically or mechanically, and it is therefore important that the manufacturer be able to easily and accurately measure the bond strengths available with the various formulations and techniques he develops.

Bond testing as practiced heretofore has called either upon rather crude methods and apparatus or upon excessively sophisticated and costly equipment designed for other purposes. An example of the latter is the use of stress-strain analyzers such a the Instron tester. For an example of the former, one method currently in use employs a spring scale, e.g., a fish scale, which is attached to a free end of the film and pulled by hand. By exerting a steady pull a reading may be taken during the delamination. Accurate, repeatable results are seldom obtained because of the fallability of human judgement of rate, magnitude, and steadiness of pull.

SUMMARY OF THE INVENTION

Objects of the present invention are to provide a measuring method and apparatus which are simple in operation, which enhance the reproducibility of results, and which moreover are easily and inexpensively made.

In accordance with the invention, the measuring apparatus comprises means, such as a table, for supporting the substrate and film. Preferably, the support means permits sliding motion as the film is pulled from over a guide, which may be formed by an edge of the table. The guide and sliding support keep the angle of pull constant, preferably at 90°, for accurately reproducible measurements. The free end of the film is gripped tangentially to drum means mounted for rotation by an electric motor. Current measuring means, such as a milliammeter, is connected to the electric motor means so as to indicate amount of current flow and thereby to indicate the delaminating force required to separate the film from the substrate. In a further aspect, the invention includes the method of measuring delaminating force which comprises supporting the substrate and film with freedom to slide in the plane of the film; securing a free end of the film tangentially to a drum; rotating the drum with electric motor means to pull the film from the substrate; and measuring the current used by the motor to indicate the delaminating force. In still further aspects, the invention includes a highly practical and simply operated means for gripping the film which comprises a slotted pin, and spring means, preferably forming the circumference of the drum, which exerts a pinching force on the slotted pin. The film is inserted in the slot, the pin is rotated, and the pinching force holds the film fast and uniformly. Still further, the drum is provided with a one way clutch for simplified positioning of the gripping means for attachment and release of the film.

These and further objects, aspects, and advantages of the invention will become apparent from the following description of a preferred embodiment.

DESCRIPTION OF THE DRAWING

FIG. 1 is a diagrammatic view of one embodiment of the present invention;

FIG. 2 is a diagram of circuitry of the present invention;

FIG. 3 is an end view of the drum shown schematically in FIG. 1;

FIG. 4 is a section on line 4—4 of FIG. 3; and

FIG. 5 is a section, to enlarged scale, on line 5—5 of FIG. 4, showing the slotted pin therein rotated to a film receiving position.

DESCRIPTION OF THE PREFERRED EMBODIMENT

Referring to the drawing, the embodiment shown diagrammatically in FIG. 1 comprises freely rotatable rolls $10r$ which support a substrate 12 with film 14 bonded thereto chemically or mechanically. Rolls $10r$ rotate to permit substrate 12 to move in the direction of arrow 16 as the film 14 is pulled therefrom. As depicted, the radius of curvature of the film during delamination is less than the radius of curvature of the rolls $10r$ and thus one of the rolls $10r$ forms a guide surface $11r$ to maintain the angle of delaminating pull constant at a right angle to the adhered film, even if the free end $14e$ of the film 14 is pulled at an acute angle thereto. The free end $14e$ of the film is gripped at the circumference of a cylindrical drum 18 mounted on shaft 20 for rotation by an electric motor 22 at low speed, for example, 1–2 r.p.m. The shaft 20 has a spring loaded drag 24 which loads the motor 22 above any inherent drags or coasting variations.

The principles of operation of the invention are as follows: The unknown quantity to be measured is the force F required to pull from a substrate a strip of film of selected width $t$, for example one inch. The incremental work $dW$ required to pull the film a distance $ds$ is given by $$dW = F \cdot ds \qquad (1)$$

This work is performed by the electric motor 22 which turns drum 18 through an incremental angle $dw$ by application of a torque T.

Accordingly,
$$dW = T\,dw \qquad (2)$$
$$F\,ds = T\,dw \qquad (3)$$

$$F = T\frac{dw}{ds} \quad (4)$$

The expression $dw/ds$ is readily seen to be a constant whenever the film 14 is tangent to the surface of drum 18. Therefore, $$F = TK_1 \quad (5)$$

where $K_1$ is a constant. By providing means for reading the torque exerted by electric motor 22, a proportional reading of delaminating force F can be obtained.

It is well known what the torque of an electric motor is related to the current it draws in a definite manner. Therefore, by providing means for measuring current, it is possible to measure torque and delaminating force F. FIG. 2 illustrates a circuit adapted to connect a milliammeter M1 with a DC electric motor so that the milliammeter will provide a direct reading of torque and delaminating force F.

As FIG. 2 illustrates, the milliammeter M1 is connected in series with both armature winding 22a of electric motor 22 and resistor R2. Paralleling the series-connected R2, M1 and 22a, is a potentiometer R1 and a DC power source P. The DC power source P is illustrated as comprising terminals A, C for connection to a source of alternating current, step down transformer T1, and a full wave bridge rectifier comprised of diodes D1 through D4.

For DC electric motors, $$T = K\phi I_a$$

where K is a constant, $\phi$ is the flux in the field winding, and $I_a$ is the armature current. Milliammeter M1, which reads the armature current $I_a$, therefore will provide a direct indication of the delaminating force F. The milliammeter M1 can be calibrated of course, to read in whatever units of force are desired, for example, pounds or kilograms.

FIGS. 3, 4 and 5 illustrate additional aspects of the invention. In FIGS. 3–5, the substrate 1 and film 14 are supported for sliding motion in the direction of arrow 16 by a support table 10t instead of the rolls 10r of FIG. 1. The delaminated film is here guided by edge 11t of the table for low friction positioning of the film to maintain a constant angle of pull as it is delaminated.

As shown in FIGS. 3 to 5, drum 18 comprises an inner cylindrical portion 30 keyed to motor shaft 20 and connected by means of one-way clutch 32 to an outer cylindrical portion 34. The one way clutch 32 comprises wedge-shaped spaces 36 cut in outer portion 34 into which spring biased balls 38 are urged. It is easily seen that when shaft 20 is rotated in the direction of arrow 40, the balls 38 will jam and cause outer drum portion 34 to rotate therewith. However, when outer portion 34 is rotated in the direction of arrow 40 relative to shaft 20, the balls 38 will slip and outer drum portion 34 can be made to override drive shaft 20.

Encircling outer drum portion 34 is a generally cylindrical spring 42 secured to drum portion 34 by a screw 44, and which is split diametrically opposite thereto. The split ends form two opposed concave surfaces 46a, 46b which mate with a slotted pin 50 and exert a pinching force thereon. The slot 52 provided in pin 50 is adapted to receive the free end 14e of the film 14, and pin 50 is provided with a handle 54 to facilitate rotation of the pin 50 to a position clamping film 14 between the surface of pin 50 and one of the concave surfaces 46a or 46b.

Operation of the device illustrated in FIGS. 3 through 5 is as follows.

The substrate 12 and film 14 are supported on table 10t with free end 14e of the film guided by table edge 11t.

Drum 18 is rotated, slipping clutch 32, until pin 50 is adjacent the film. The pin 50 is rotated until its slot 52 can freely receive the film (FIG. 5). Pin 50 is then rotated until film 14 is firmly clamped between pin 50 and spring surface 46a (FIG. 3). Motor 22 is energized to rotate drum 18 in the direction of arrow 40 to pull film 14 from substrate 12. The current drawn by motor 22 is measured by milliammeter M1 and the meter is observed for a reading of delaminating force. After the reading is taken, motor 22 can be stopped, and pin 50 can be rotated to release the film 14.

I claim:
1. Apparatus for measuring the delaminating force required to separate a film from a substrate to which it is bonded, comprising:
    means for supporting the substrate and film;
    drum means mounted for rotation and adapted to grip a free end of said film;
    electric motor means for rotating said drum, thereby to pull said film from said substrate;
    current measuring means connected to said electric motor means for indicating the amount of current drawn, thereby to provide an indication of the required delaminating force;
    said drum means comprising:
        slotted pin means for receiving the free end of said film;
        spring means mounting said pin for rotation and exerting a pinching force thereon, whereby said pin may be positioned to freely receive the strip in said slot and rotated to grip said strip between said pin and said spring means.
2. Apparatus according to claim 1 wherein said spring means comprises a substantially circular spring forming the surface of said drum and terminating in opposed concave surfaces receiving said pin, and means opposite said pin for securing said spring to the remainder of said drum means.
3. Apparatus for measuring the delaminating force required to separate a film from a substrate to which it is bonded, comprising:
    means for supporting the substrate and film;
    drum means mounted for rotation and adapted to grip a free end of said film;
    electric motor means for rotating said drum, thereby to pull said film from said substrate;
    current measuring means connected to said motor means for indicating the amount of current drawn, thereby to provide an indication of the required delaminating force;
    said drum means comprising:
        an inner portion driven by said electric motor means;
        an outer portion surrounding said inner portion;
        means interengaging said inner and outer portions for driving engagement in one direction of relative rotation and slipping engagement in the opposite direction of relative rotation;
        whereby said drum surface may be easily positioned for gripping of said strip.

References Cited

UNITED STATES PATENTS

| | | | |
|---|---|---|---|
| 3,019,644 | 2/1962 | Mancini | 73—150 |
| 3,186,221 | 6/1965 | Steib | 73—150 |
| 3,372,583 | 3/1968 | Van Beek | 73—150 |
| 3,412,606 | 11/1968 | Cooper et al. | 73—150 |

FOREIGN PATENTS 139,129   1/1960   Russia.

OTHER REFERENCES

Abstract: "Peel Resistance Accurately Measured," Materials Research & Standards, p. 435, August 1965, copy located in class 73, subclass 150.

LOUIS R. PRINCE, Primary Examiner

D. E. CORR, Assistant Examiner